(12) United States Patent
Cox et al.

(10) Patent No.: US 7,818,739 B2
(45) Date of Patent: *Oct. 19, 2010

(54) VIRUS DETECTION SYSTEM, METHOD AND COMPUTER PROGRAM PRODUCT FOR HANDHELD COMPUTERS

(75) Inventors: Brian R. Cox, Aloha, OR (US); Do Kim, Portland, OR (US); Brandt Haagensen, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 692 days.

This patent is subject to a terminal disclaimer.

(21) Appl. No.: 10/874,432

(22) Filed: Jun. 22, 2004

(65) Prior Publication Data

US 2004/0237079 A1 Nov. 25, 2004

Related U.S. Application Data

(63) Continuation of application No. 09/534,957, filed on Mar. 24, 2000, now Pat. No. 6,842,861.

(51) Int. Cl.
G06F 9/44 (2006.01)
G06F 9/445 (2006.01)

(52) U.S. Cl. .................. 717/171; 717/168; 717/169; 717/170; 717/174; 717/175; 717/176

(58) Field of Classification Search ......... 717/168–178; 713/187–189, 375, 400, 401; 707/200–203, 707/1, 3, 6, 104.1; 709/217–222, 248–253
See application file for complete search history.

(56) References Cited

U.S. PATENT DOCUMENTS

| 5,410,326 A | | 4/1995 | Goldstein ............... 348/734 |
| 5,519,606 A | * | 5/1996 | Frid-Nielsen et al. ......... 705/9 |
| 5,627,977 A | | 5/1997 | Hickey et al. ............. 715/746 |
| 5,802,277 A | | 9/1998 | Cowlard ................. 726/22 |
| 5,835,911 A | * | 11/1998 | Nakagawa et al. .......... 707/203 |
| 5,857,201 A | * | 1/1999 | Wright et al. ............ 707/104.1 |

(Continued)

FOREIGN PATENT DOCUMENTS

GB 2283341 3/1995

(Continued)

OTHER PUBLICATIONS

Notice of Allowance from U.S. Appl. No. 09/802,452 mailed on Feb. 25, 2005.

(Continued)

*Primary Examiner*—Insun Kang
(74) *Attorney, Agent, or Firm*—Zilka-Kotab, PC (57) ABSTRACT

A method and system are provided for updating software on a handheld computer in communication with a client computer system operable to connect to a network. Software installed on the handheld computer is identified with the client computer. Moreover, information on the identified software is transmitted from the client computer to a server connected to the network. Further, updated versions of the software installed on the handheld computer are transferred from the server to the client computer based on the identified software that is installed on the handheld computer. Still yet, the software installed on the handheld computer is updated with the updated versions transferred to the client computer.

26 Claims, 9 Drawing Sheets

U.S. PATENT DOCUMENTS

| | | | | |
|---|---|---|---|---|
| 5,889,943 | A | | 3/1999 | Ji et al. .......................... 726/22 |
| 5,948,104 | A | | 9/1999 | Gluck et al. ................. 713/200 |
| 5,951,698 | A | | 9/1999 | Chen et al. .................... 714/38 |
| 5,956,481 | A | | 9/1999 | Walsh et al. ................. 395/186 |
| 5,960,170 | A | | 9/1999 | Chen et al. ............. 395/183.14 |
| 5,999,740 | A | * | 12/1999 | Rowley ....................... 717/173 |
| 6,006,274 | A | * | 12/1999 | Hawkins et al. ............. 709/248 |
| 6,035,423 | A | | 3/2000 | Hodges et al. ................. 714/38 |
| 6,075,863 | A | | 6/2000 | Krishnan et al. .............. 380/49 |
| 6,088,803 | A | | 7/2000 | Tso et al. ...................... 726/22 |
| 6,119,165 | A | | 9/2000 | Li et al. ....................... 709/229 |
| 6,151,643 | A | * | 11/2000 | Cheng et al. .................. 710/36 |
| 6,167,567 | A | * | 12/2000 | Chiles et al. ................. 717/173 |
| 6,212,635 | B1 | * | 4/2001 | Reardon ....................... 713/165 |
| 6,279,113 | B1 | | 8/2001 | Vaidya ......................... 726/23 |
| 6,292,833 | B1 | | 9/2001 | Liao et al. ................... 709/229 |
| 6,324,542 | B1 | * | 11/2001 | Wright et al. ............ 707/104.1 |
| 6,324,693 | B1 | * | 11/2001 | Brodersen et al. ........... 717/177 |
| 6,327,579 | B1 | | 12/2001 | Crawford .................... 705/400 |
| 6,338,141 | B1 | | 1/2002 | Wells ........................... 726/24 |
| 6,347,375 | B1 | | 2/2002 | Reinert et al. ................. 726/24 |
| 6,353,926 | B1 | * | 3/2002 | Parthesarathy et al. ...... 717/170 |
| 6,360,366 | B1 | * | 3/2002 | Heath et al. ................. 717/178 |
| 6,397,335 | B1 | | 5/2002 | Franczek et al. .............. 726/24 |
| 6,401,210 | B1 | | 6/2002 | Templeton ................... 726/24 |
| 6,405,049 | B2 | | 6/2002 | Herrod et al. ................ 455/517 |
| 6,421,733 | B1 | * | 7/2002 | Tso et al. ..................... 709/246 |
| 6,457,062 | B1 | * | 9/2002 | Pivowar et al. .............. 709/248 |
| 6,470,332 | B1 | * | 10/2002 | Weschler ......................... 707/3 |
| 6,477,543 | B1 | * | 11/2002 | Huang et al. ................. 707/200 |
| 6,477,565 | B1 | * | 11/2002 | Daswani et al. ............. 709/217 |
| 6,496,979 | B1 | | 12/2002 | Chen et al. .................. 717/178 |
| 6,553,375 | B1 | * | 4/2003 | Huang et al. .................. 707/10 |
| 6,647,499 | B1 | * | 11/2003 | Morcom ...................... 713/300 |
| 6,671,757 | B1 | * | 12/2003 | Multer et al. ............... 710/100 |
| 6,678,727 | B1 | * | 1/2004 | Lee et al. ..................... 709/221 |
| 6,742,025 | B2 | * | 5/2004 | Jennery et al. .............. 709/220 |
| 6,785,868 | B1 | * | 8/2004 | Raff ............................ 715/530 |
| 6,813,765 | B1 | * | 11/2004 | Flores ......................... 717/174 |
| 6,965,928 | B1 | | 11/2005 | Cox et al. .................... 709/220 |
| 7,039,656 | B1 | * | 5/2006 | Tsai et al. .................... 707/201 |
| 7,080,371 | B1 | * | 7/2006 | Arnaiz et al. ................ 717/170 |
| 2001/0005889 | A1 | * | 6/2001 | Albrecht ...................... 713/201 |
| 2001/0011308 | A1 | * | 8/2001 | Clark et al. .................... 710/20 |
| 2001/0044805 | A1 | * | 11/2001 | Multer et al. ................ 707/201 |
| 2002/0016853 | A1 | * | 2/2002 | Ressler ........................ 709/236 |
| 2002/0078072 | A1 | * | 6/2002 | Tan et al. ..................... 707/201 |
| 2002/0112041 | A1 | * | 8/2002 | Viscount et al. ............. 709/223 |
| 2008/0060075 | A1 | | 3/2008 | Cox et al. ...................... 726/24 |

FOREIGN PATENT DOCUMENTS

WO           93/22723           11/1993

OTHER PUBLICATIONS

Office Action Summary from U.S. Appl. No. 11/855,961 mailed on Jun. 26, 2009.
Notice of Allowance from U.S. Appl. No. 11/855,961 mailed on Feb. 24, 2010.
International Search Report from PCT/US01/07624 mailed Jun. 1, 2001.
The Written Opinion from PCT/US01/07624 mailed Jun. 13, 2002.
International Preliminary Examination Report from PCT/US01/07624 mailed Sep. 12, 2002.
Examination Report from EP 01914786 mailed Jun. 27, 2006.
The European Search Report from EP 01914786 mailed Apr. 20, 2006.
Office Action Summary from U.S. Appl. No. 09/802,452 which was mailed Nov. 12, 2004.
Office Action Summary from U.S. Appl. No. 09/802,452 which was mailed Jun. 8, 2004.

* cited by examiner

OPTIONS

○ RUN VIRUS SCAN BEFORE SYNC OPERATION

○ RUN VIRUS SCAN AFTER SYNC OPERATION

○ SCAN ALL FILES

○ SCAN ONLY PROGRAM FILES

○ SCAN ONLY DATA RECORDS

○ SCAN DATA RECORDS: __________    ⟋134

○ DISABLE VIRUS SCAN WHEN A VIRUS IS FOUND:

PROMPT FOR USER ACTION:

POSSIBLE ACTIONS:
   CLEAN FILE
   DELETE FILE
   IGNORE FILE
   QUARANTINE FILE

○ CLEAN AUTOMATICALLY

○ DELETE AUTOMATICALLY

○ IGNORE

○ QUARANTINE AUTOMATICALLY

VIRUS DETECTION SYSTEM, METHOD AND COMPUTER PROGRAM PRODUCT FOR HANDHELD COMPUTERS

RELATED APPLICATION(S)

The present application is a continuation of a parent application filed Mar. 24, 2000 under application Ser. No. 09/534,957, issued as U.S. Pat. No. 6,842,861, which is incorporated herein by reference.

BACKGROUND OF THE INVENTION

The present invention relates generally to a virus detection system and method, and more particularly, to a system and method for detecting viruses on handheld computers.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the Internet, viruses can rapidly spread.

The term virus generally refers to any destructible or harmful program or code that attempts to hide its possibly malicious function or tries to spread onto as many computer as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Another common virus is a boot sector virus which replaces the computer system's master boot record with its own code. The boot sector virus is a small program executed each time a computer boots. The virus infects floppy disks and hard disks by inserting itself into the boot sector of the disk, which contains code that is executed during the system boot process. Since the master boot record executes every time the computer is started, the boot sector virus can be very dangerous to the integrity of the computer system. The boot sector virus typically enters the computer system through a floppy disk installed in the floppy drive when the computer system is started.

Another type of virus, which is often difficult to detect, is a polymorphic virus. This virus produces varied but operational copies of itself. Code within the virus includes an encryption routine to help the virus hide from detection, plus a decryption routine to restore the virus to its original state when it executes.

A Trojan horse is another type of virus which masquerades as a legitimate software program. The Trojan horse generally does not replicate. It waits until its trigger event occurs and then displays a message or destroys files or disks.

A computer worm is another type of virus that can replicate itself and use memory but cannot attach itself to other programs. The computer worm is a self-contained program, or set of programs, that is able to spread functional copies of itself or its segments to other computer systems, usually via network connections. Host computer worms are entirely contained in the computer they run on and use network connections only to copy themselves to other computers. Network worms consist of multiple parts (called "segments"), each running on different machines and using the network for several communication purposes.

Many antivirus programs have become commercially available for protection against viruses. There are three main types of antivirus software: activity monitors, scanners, and integrity checkers. Activity monitoring programs attempt to prevent infection before it happens by looking for virus type activity, such as attempts to reformat a disk. Scanners are the most widely used type of antivirus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the antivirus program to download profiles of new viruses from the Internet so that the program can check for new viruses soon after they are discovered. Most scanners also include virus removers which are operable to clean infected files. One example of an antivirus scanner is McAfee's VSHIELD.

The third type of antivirus software, integrity checkers, compute a small checksum or hash value for files which are presumably uninfected, and later compare newly calculated values with the original ones to see if the files have been modified. These programs catch unknown viruses as well as known ones. As with scanners, integrity checkers may be called to check entire disks or they may be resident, checking each program that is about to be executed.

Most of the antivirus software available today, such as conventional device resident antivirus scanners, require a large amount of memory. For example, typical scanner software requires approximately 16 MB RAM. While this memory is typically insignificant on personal computers (e.g., desktop or laptop computers) handheld computers often include no more than 2 MB dynamic memory and storage and are not equipped to handle such large memory requirements. Furthermore, handheld computers are generally too slow to provide reasonable virus scanning performance.

Moreover, many handheld computers are not equipped to provide network access, and those that can connect with a network, utilize a connection that is either too slow or expensive to be practical for the sizable transfer of data, such as updates to handheld computer applications.

Handheld computers include devices such as personal digital assistants (PDAs) and smart phones which are generally small enough to be held in the hand of a user. These devices typically include applications such as an address book, daily organizer, and electronic notepad. Examples of handheld computers include 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Psion's REVO, NETBOOK, and WORKABOUT, NeoPoint's 1000, and Qualcomm's PDQ. Handheld computers are widely operated in an environment where software and data records are shared between users. For example, software may be transferred between two handheld computers or downloaded from a personal computer system to a handheld computer. Handheld computers may also receive e-mail messages and other data from another handheld computer via an infrared port or from a personal computer through a modem, serial line connection, or network. In this shared environment, computer viruses can spread among handheld computers as rapidly as they do with personal computer systems.

There is, therefore, a need for a system and method for detecting viruses on handheld computers. There is also a need for an efficient method for updating applications on the handheld computer.

SUMMARY OF THE INVENTION

A method and system are provided for updating software on a handheld computer in communication with a client computer system operable to connect to a network. Software installed on the handheld computer is identified with the client computer. Moreover, information on the identified software is transmitted from the client computer to a server connected to the network. Further, updated versions of the software installed on the handheld computer are transferred from the server to the client computer based on the identified software that is installed on the handheld computer. Still yet, the software installed on the handheld computer is updated with the updated versions transferred to the client computer.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
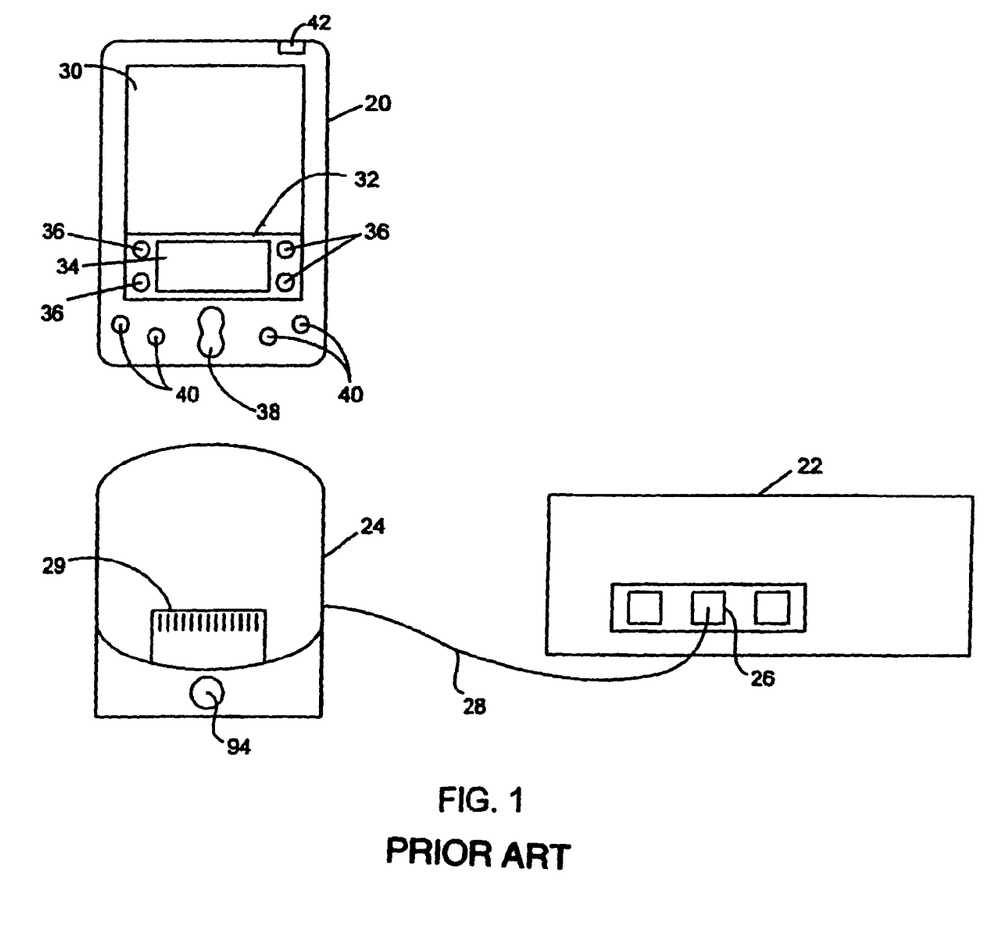
FIG. 1 is a schematic of a handheld computer and a personal computer equipped with a cradle for synchronizing with the handheld computer.

Referring now to the drawings, and first to FIG. 1, a handheld computer 20 and a personal computer 22 equipped with a cradle 24 for communication with the handheld computer are shown. The cradle 24 is attached to a serial port 26 of the personal computer 22 and is used to provide a communication link 28 (e.g., serial data line, USB connection, parallel (printer port) connection, FireWire connection, PCMCIA connection, or any other type of data communication line) between the handheld computer 20 and the personal computer 22. The serial communication line 28 extends from the serial port 26 and terminates at a serial connector 29 on the cradle 24. A matching serial connector (not shown) on the handheld computer 20 connects the handheld computer to the personal computer 22. The communication link may also be a communication path over a network or a wireless communication link, as further described below.

The handheld computer 20 typically does not include sufficient memory to allow for efficient virus scanning of files directly on the handheld computer. The present invention provides a system and method for scanning handheld computer files (including, for example, applications and data records) with an antivirus scanner located on the personal computer 22, which is in communication with the handheld computer.

The handheld computer 20 is generally a mobile computing device that is sufficiently compact such that it can be held in a users hands and easily carried by the user. Examples of handheld computers include the following personal digital assistants (PDAs): 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACK-BERRY, Franklin's REX, Symbol's SPT and PPT, and Psion's REVO, NETBOOK, and WORKABOUT. Handheld computers also include "smart" phones such as those manufactured by Nokia, Erikson, NeoPoint, and Qualcomm. The term handheld computer, as used herein, generally includes any compact computing device operable to transfer executable code between itself and another computer. The term handheld computer also includes devices which may be connected to a larger device, such as Clarion's AUTO PC, which is a personal assistant that can be placed in the dash board of an automobile. Many of these handheld computers operate on a PalmOS platform, or use a Windows CE or EPOC operating system. It is to be understood that the devices and operating systems listed above are merely provided as examples and that the invention is not limited to use with these devices and systems.

FIG. 1 shows an exemplary handheld computer available from 3COM of Santa Clara, Calif., under the product name PALM V. Most of the surface area of the handheld computer 20 consists of a screen display area 30 which is used to display information to the user. The screen display area 30 is covered with a touch sensitive digitizer pad that can detect user interaction with a stylus or a finger. Below the display area 30 is a user input area 32 which is used to input text in a writing area 34 and interact with application buttons 36. Below the user input area 32 are mechanical scrolling button 38 and application buttons 40. A mechanical power button 42 is provided to turn the handheld computer 20 on and off. The application buttons 40 are used to execute applications such as an address book, calendar, To-Do list, or memo pad. It is to be understood that the handheld computer 20 may be different than shown and described herein without departing from the scope of the invention. For example, the handheld computer may include a miniaturized keyboard and display screen such as included in the Hewlett Packard JORNADA 680.

Figure 2:
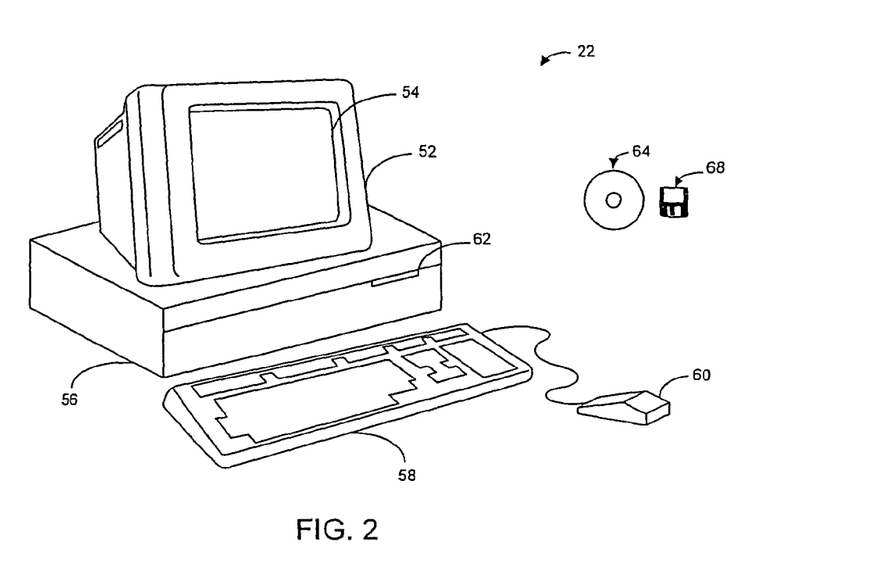
FIG. 2 is a schematic illustrating an example of a computer system that can be utilized to execute software of an embodiment of the invention.

The personal computer (computer system) 22 may be a stand-alone desktop computer, laptop computer, or a mainframe computer, for example. The personal computer 22 may be configured for use as a server or other networked computer. FIG. 2 illustrates an example of a computer system 22 that can communicate with the handheld computer 20 and be used to execute software of an embodiment of the invention. The computer system 22 includes a display 52, screen 54, cabinet 56, keyboard 58, and mouse 60, which may include one or more buttons for interacting with a GUI (Graphical User Interface). Cabinet 56 houses a CD-ROM drive 62, system memory 72 and fixed storage 74 (see FIG. 3) which can be utilized to store and retrieve software programs incorporating computer code that implements aspects of the invention, data for use with the invention, and the like. Although CD-ROM 64 and floppy disk 68 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 3:
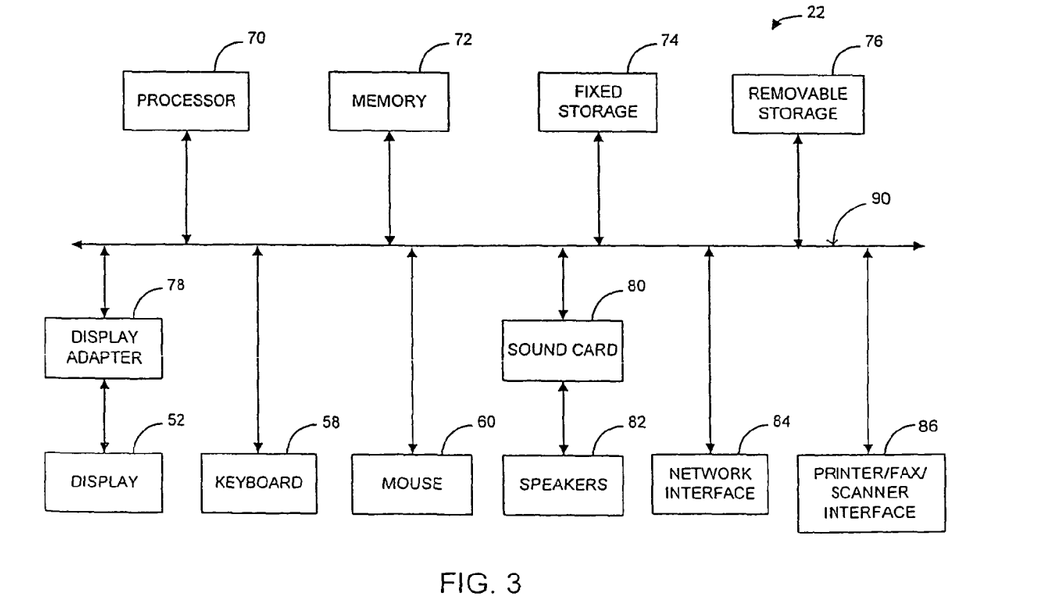
FIG. 3 is a system block diagram of the computer system of FIG. 2.

FIG. 3 shows a system block diagram of computer system 22 used to execute software of an embodiment of the invention. Computer system 22 further includes subsystems such as a central processor 70, system memory 72, fixed storage 74 (e.g., hard drive), removable storage 76 (e.g., CD-ROM drive), display adapter 78, sound card 80, transducers 82 (e.g., speakers, microphones, and the like), network interface 84, and printer/fax/scanner interface 86. Other computer systems suitable for use with the invention may include additional or fewer subsystems. For example, computer system 22 may include more than one processor 70 (i.e., a multi-processor system) or a cache memory.

The system bus architecture of computer system 22 is represented by arrows 90 in FIG. 3. However, these arrows are only illustrative of one possible interconnection scheme serving to link the subsystems. For example, a local bus could be utilized to connect the central processor 70 to the system memory 72 and display adapter 78. Computer system 22 shown in FIGS. 2 and 3 is but an example of a computer system suitable for use with the invention. Other computer architectures having different configurations or subsystems may also be utilized.

The computer system 22 may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol). Servers capable of sending and receiving information over the Internet are also connected to the Internet. The servers may comprise a World Wide Web site having a variety of software updates for handheld computer programs or applications, as further described below with respect to FIG. 10. The server may be associated with a particular software manufacturer, which stores and maintains versions of specific handheld computer applications, or the server may comprise a variety of different applications and update information. The client computer 22 may also be connected to the server through a LAN, WAN, or any other type of network.

The handheld computer 20 generally includes a suite of personal information management (PIM) applications such as an address book, daily organizer, To-Do list, and memo pad (FIG. 1). Most people that use a handheld computer 20 also use a personal computer 22 with similar PIM applications. The handheld computer 20 allows a user to have at his fingertips the information contained within PIM applications (e.g., Microsoft Outlook, Palm Desktop) resident on the personal computer 22. In order to keep the information on the handheld computer 20 up to date with information on the personal computer 22 and to prevent having to enter the same information on both computers, information is synchronized between the handheld computer and the personal computer.

Synchronization is a process of merging two databases, one on the handheld computer 20 and one on the personal computer 22. In order to synchronize information between the handheld computer 20 and the personal computer 22, the handheld computer is placed in the cradle 24 and a synchronization button 94 is pressed (FIG. 1). Actuation of the synchronization button 94 causes a synchronization program on the handheld computer 20 to execute which in turn starts a corresponding synchronization program on the personal computer 22. The synchronization operation may also begin automatically when the handheld computer 20 is placed in the cradle 24. The handheld computer 20 preferably has a name assigned to it the first time it is synchronized with the personal computer 22. This allows a second handheld computer 20 to be synchronized with the same personal computer 22. The handheld computer 20 may also be synchronized with a second personal computer 22 since users often have a personal computer at work and a different personal computer at home. As described below, virus scanning of files on the handheld computer 20 may be performed in conjunction with the synchronization operation. The cradle 24 may also include a scanning button, similar to the synchronization button 94, so that scanning can be performed independent from the synchronization process.

The handheld computer 20 may include a modem so that the handheld computer can be synchronized and its files scanned for viruses remotely from the personal computer 22. The modem may be attached to a phone line or use a wireless connection. In order to synchronize and scan files on the handheld computer 20 remotely, software on the handheld computer dials a modem coupled to the personal computer 22. Once the call has been answered, software on the handheld computer 20 sends a synchronization request to the computer 22. The handheld computer 20 may then be synchronized with the personal computer 22 and scanned for viruses over the remote connection. The handheld computer 20 may also be synchronized and scanned for viruses over a network. If the user has access to a personal computer that is coupled to his own personal computer 22 through a network, the user can use the network as a communication medium. Virus scanning and synchronization can be performed by dialing in to a network or by using the cradle 24 connected to any computer on the same LAN or WAN as the user's personal computer 22.

Figure 4:
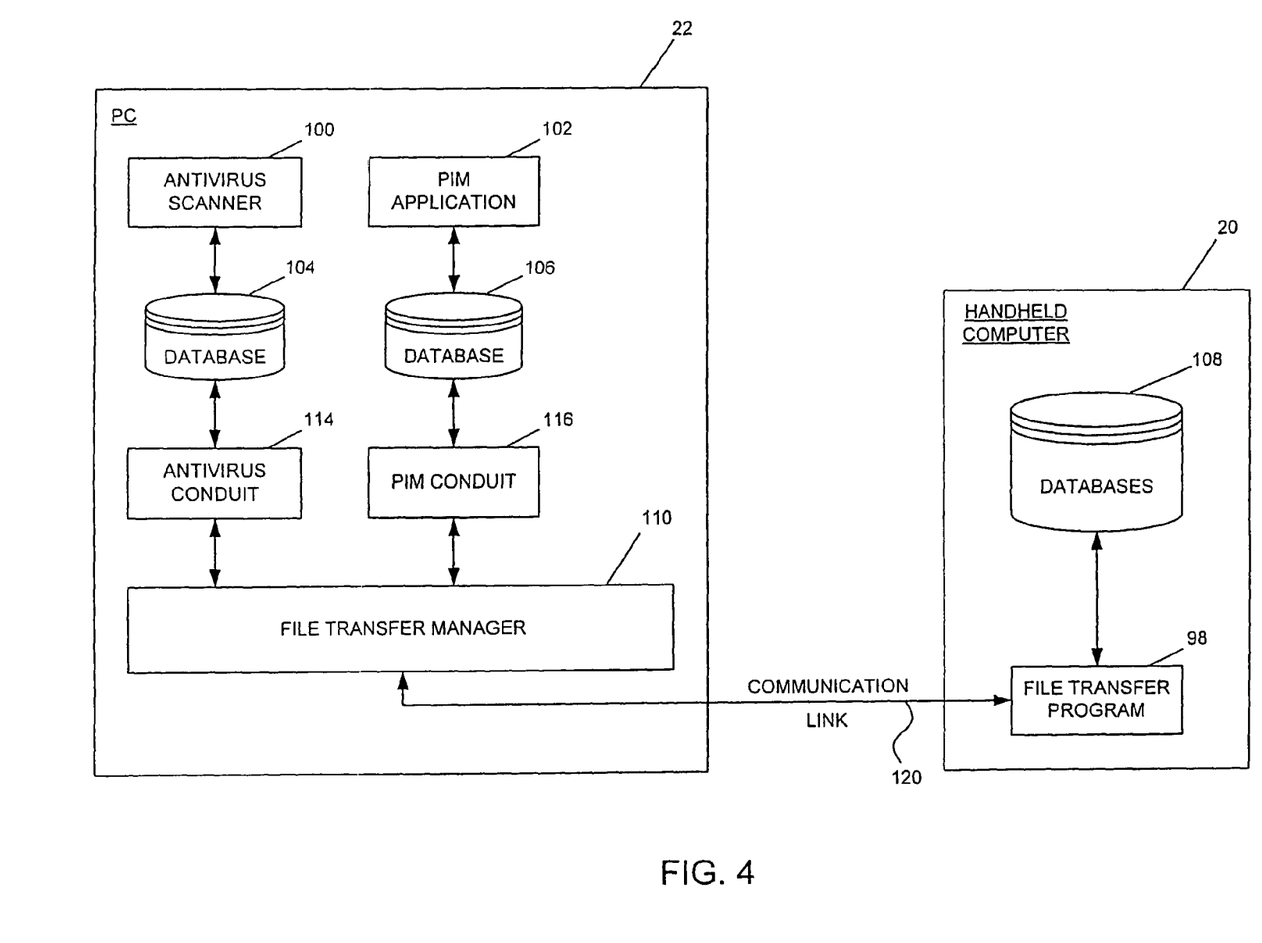
FIG. 4 is a block diagram illustrating a file transfer program on the handheld computer communicating with an antivirus scanner and a PIM application on the personal computer.

FIG. 4 illustrates a file transfer program 98 on the handheld computer 20 communicating with an antivirus scanner 100 and PIM application 102 on the personal computer 22. The handheld computer 20 and personal computer 22 are in communication with one another through a communication link 120. As previously described, the communication link 120 may be a serial line, dial-up line, network, or wireless connection. The antivirus scanner 100 scans files downloaded into an antivirus database 104 and the PIM application 102 receives and sends data to PIM database 106. Data is typically stored on the handheld computer 20 in memory chunks called records, which are grouped into databases 108. The database 108 is analogous to a file except that data is broken down into multiple records instead of being stored in one contiguous chunk. Each database 108 includes a database header and record information. A data manager keeps track of records using a record ID that is assigned by the operating system. Each data record may include a flag which identifies if the record is new, modified, or deleted. The handheld computer 20 and the personal computer 22 maintain a set of status flags for each of their corresponding data records. After each synchronization, all the data record status flags are cleared since the two systems have identical databases after the synchronization.

The personal computer 22 includes a file transfer program manager 110 which communicates with the file transfer program 98 within the handheld computer 20. On a personal computer using the PALM operating system, the file transfer manager is called a HOTSYNC manager. The manager 110 manages the synchronization and virus scanning process and calls on conduits to perform the actual data manipulation. Antivirus conduit 114 interfaces with the database 104 and antivirus scanner 100 to control the antivirus scanning. PIM conduit 116 controls synchronization with the PIM application 102. The conduits 114, 116 are dynamic link libraries (DLLs) that are called during a virus scan and synchronization operation, respectively. The conduits 114, 116 are responsible for reading and writing both the personal computer databases 104, 106 and the handheld computer databases 108 and for performing any data transformations or file value mappings required to accurately move data between the two systems.

The antivirus conduit 114 may include a priority setting so that a user can specify whether the antivirus scanning should run first or last. The priority may be set in a priority entry in a window registry, for example. The priority entry determines the order in which the conduits 114, 116 will be loaded. If the user typically copies files from the handheld computer 20 to the personal computer 22, it is preferred to run the antivirus conduit 114 first, so that a virus can be caught before it is transferred to the personal computer 22 in executable form. If the user typically copies files from the personal computer 22 to the handheld device 20, the antivirus conduit 114 is preferably run last, to ensure that the handheld computer is in a clean state following the synchronization operation. The priority may be set by a user each time the antivirus scan is performed or a default priority may be set. The user may also may also elect to run the antivirus conduit 114 alone, without running the PIM conduit, or any other conduits.

Figure 5:
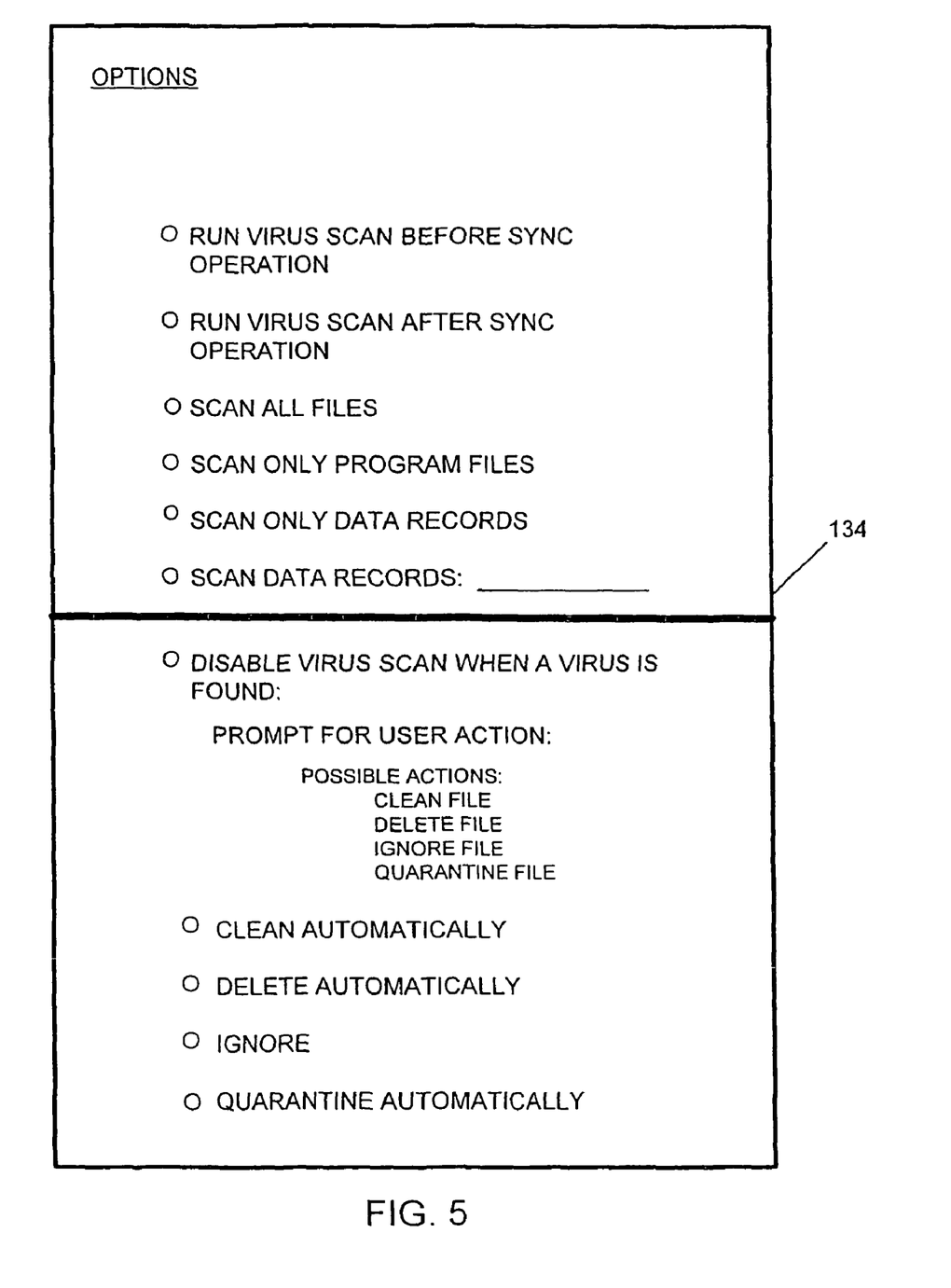
FIG. 5 is a dialog box displayed on a screen of the personal computer to provide options for virus scanning of files on the handheld computer.

In addition to setting the sequence of operations, a user may also select which applications or data records are scanned. For example, the user may elect to scan: all databases 108 of the handheld computer 20 or only those of a specific type; all records in a resource database, or only those of certain resource types; or files in ROM in addition to the files in RAM. FIG. 5 illustrates an example of a dialog box 134 displayed on the display screen 54 of the personal computer 22 to provide scanning options to the user. Also presented to the user is a list of actions to take when a virus is found. The user may request the program to prompt the user for action or always perform a specified action when a virus is found. The handheld computer 20 may also include software which displays scanning options on the handheld computer so that the user may configure the scanning operation from the handheld computer rather than the personal computer 22. The preferred scanning information entered by the user on the handheld computer 20 can be transferred to the personal computer during the synchronization or scanning operation.

Figure 6:
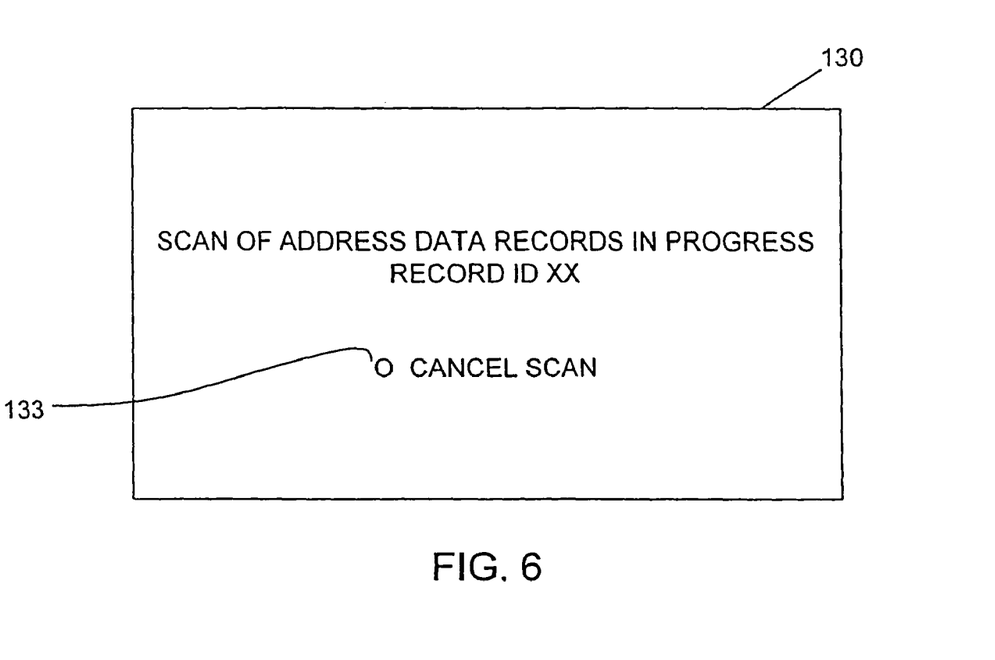
FIG. 6 is a dialog box displayed on the personal computer screen while files resident on the handheld computer are copied and scanned on the personal computer.
Figure 7:
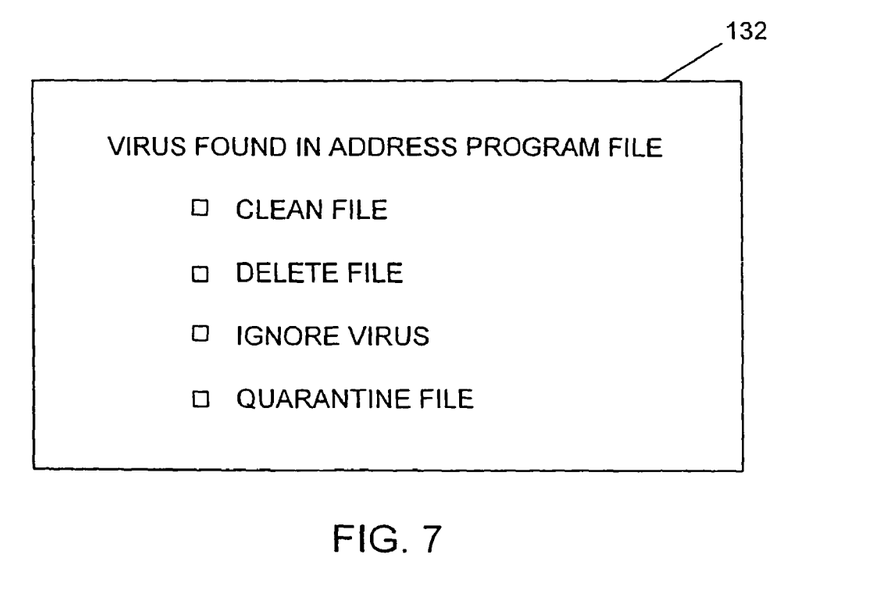
FIG. 7 is a dialog box indicating that a virus has been found in one of the files copied from the handheld computer and requesting user direction as to what to do with the infected file.

Once the file transfer manager 110 starts the processing of conduits 114, 116, the manager provides a callback routine which is used by the conduits to report the progress of their activities so that the progress of the virus scanning or synchronization can be displayed on the personal computer's display screen 54 (FIGS. 4, 6, and 7). As shown in FIG. 6, a dialog box 130 may specify which records are currently being scanned. The status dialog box 130 is preferably continuously updated with the name of the remote file being scanned, status data, and the current record number. The dialog box 130 further includes a cancel button 133. If the cancel button 133 is selected at anytime during the scanning process, the antivirus conduit 114 writes any unsaved changes back to the handheld computer 20, exits, and allows any remaining conduits to run. The dialog box 130 may also include a "More Information" button, which will query the virus information library (VIL) database and show the results in a browser window. If a virus is found, a dialog box 132, such as shown in FIG. 7, may be displayed. The box 132 includes a list of actions (e.g., clean, delete, ignore, quarantine) a user can request the antivirus program to perform on the infected file.

The antivirus program may be an application such as McAfee's VSHIELD, ACTIVESHIELD, SCAN NOW or VIRUS SCAN program, or antivirus applications described in U.S. Pat. No. 6,029,256, issued Feb. 22, 2000 or U.S. patent application Ser. No. 09/001,611, filed Dec. 31, 1997, which are incorporated herein by reference, or any other suitable antivirus program. The antivirus program preferably contains an update agent which is resident in the background of the personal computer system 22 and polls for updates at a set interval. For example, the program may poll a server daily to check for new virus signature files or new scan engine libraries. Update component versions may be posted on an application server provider (ASP) page located on the Internet, which reports back whether there are newer versions of any of the listed components. This data may be displayed in a browser window which the user can log in to and download updated components. The handheld computer 20 may also receive an e-mail message informing the user that it is time to check the handheld computer for viruses or that new viruses have been discovered. The antivirus program may be installed on the personal computer by a disk or CD-ROM, or downloaded directly from the Internet, for example.

The antivirus program resident on the personal computer 22 may perform other functions during the scanning process. For example, the program may display advertisements or upgrade offers based on which applications a user has installed on his handheld computer 20 or personal computer 22. The antivirus program may also be configured to automatically scan files on the personal computer 22 for viruses before copying these files to the handheld computer 20 during a synchronization operation.

It is to be understood that the antivirus scanning of the handheld computer may be performed on an operating system different than the one described herein and the components of the file transfer programs, arrangement of program components, or antivirus scanner may be different than described herein, without departing from the scope of the invention.

Figure 8:
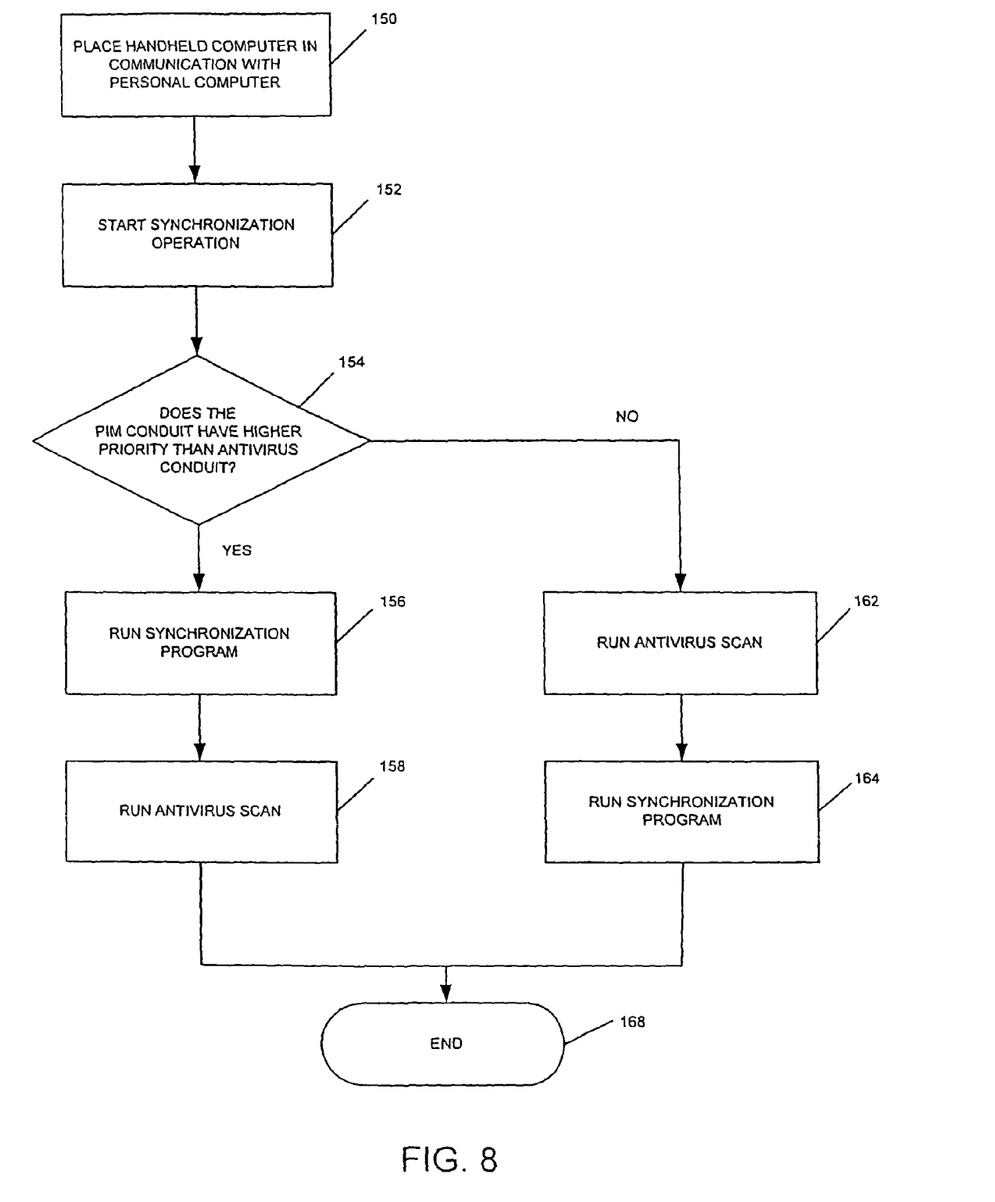
FIG. 8 is a flowchart illustrating a process for performing virus scanning and synchronization operations on the handheld computer.

FIG. 8 is a flowchart illustrating a process for performing synchronization and virus scanning operations on the handheld computer 20. The handheld computer 20 is first put into communication with the personal computer 22 to create a communication link between the handheld computer and the personal computer at step 150 (FIGS. 1 and 8). As previously described, this may involve placing the handheld computer into the cradle 24 attached to the personal computer 22 or a different computer in communication with the personal computer over a network, using a modem to create a connection between the handheld computer and personal computer, or creating a wireless connection between the handheld computer and personal computer, for example. The user starts the synchronization/scanning operation at step 152 by pushing the synchronization button 94 or selecting a synchronization menu option on the handheld computer. The file transfer manager 110 monitors communication link 120 between the handheld computer 20 and personal computer 22 and receives an interrupt which is generated by the file transfer program 98 upon initiation of a synchronization or scanning operation (FIGS. 4 and 8). The handheld computer 20 then sends wake-up packets at set intervals (e.g., every two seconds) to the personal computer 22 until the file transfer manager 110 on the personal computer acknowledges the handheld computer's wake-up call, or a time out occurs.

Once the wake-up call is acknowledged, the file transfer manager 110 looks to see if there is a priority setting for the conduits 114, 116 (step 154). If the PIM conduit 116 has a higher priority than the antivirus conduit 114, the synchronization operation will be performed first (step 156). During synchronization, the PIM conduit 116 compares each handheld computer record against the corresponding personal computer record and decides how to proceed with the information. The records may be updated, copied, or deleted in one or both of the databases 106, 108. After synchronization is complete, the antivirus conduit will run the antivirus scan (step 158). If the priority of the antivirus conduit 114 is higher than that of the PIM conduit 116, the antivirus scan will be performed first, as shown in steps 162 and 164. After both conduits 114, 116 have run, the synchronization/scanning operation will be complete (step 168). It is to be understood that the scanning operation may also be run alone without the synchronization operation, without departing from the scope of the invention. For example, a user may select an option to turn off the PIM conduit 116 and only run only the antivirus conduit 114.

Figure 9:
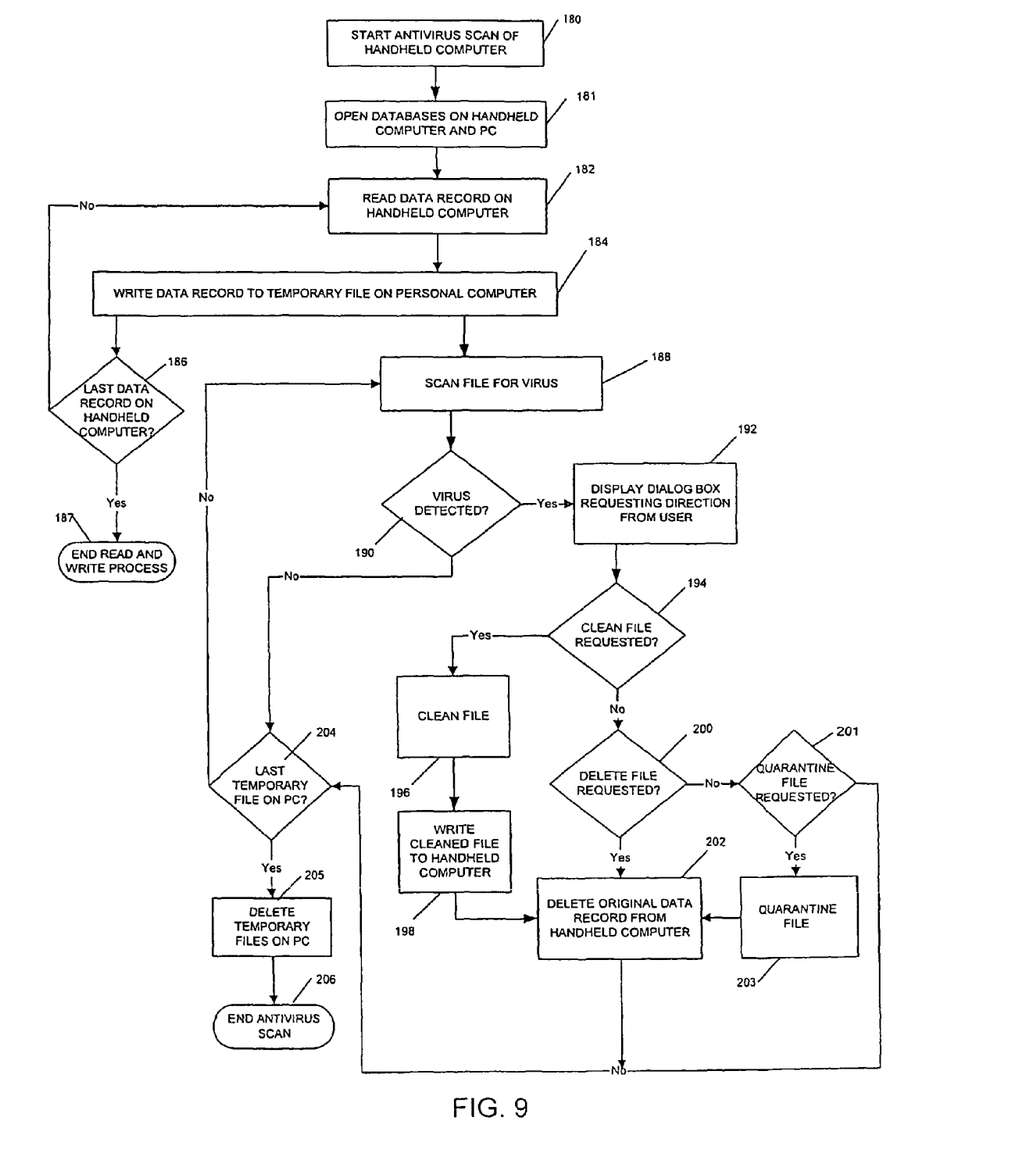
FIG. 9 is a flowchart illustrating a process for conducting a virus scan on files resident on the handheld computer.

The virus scanning process is illustrated in further detail in the flowchart of FIG. 9. At step 180 the antivirus scan is started and the antivirus conduit 114 opens up database 104 located on the personal computer 22 and databases 108 on the handheld computer 20 (step 181) (FIGS. 4 and 9). The file transfer manager 110 creates a list of databases 108 that reside on the handheld computer 20. The conduit 114 then creates empty files on the personal computer 22 to copy data contained within the databases 108. The conduit 114 reads the records from the handheld database 108 and writes the records into database 104 one by one (steps 182, 184, 186, and 187). The data is copied from the handheld computer 20 to the temporary, non-executable files created on the personal computer 22. Each record from the handheld computer 20 is read and written to a separate file within database 104 on the personal computer 22. It is to be understood that the data may be stored in the personal computer memory without writing it to a disk. Thus, the database 104 may be temporary storage in the personal computer memory.

After data is read and written to a file, the antivirus scanner 100 scans the file (step 188). Scanning is performed in a second thread different from a first thread used to read and write the data, so that the first thread can immediately start another read operation (steps 184, 186, and 182). If an infected file is found, dialog box 132 (FIG. 7) is displayed to ask the user whether he wants to delete, clean, or quarantine the file, or ignore the virus (step 192). If the user elects to clean the file, the temporary file on the personal computer 22 is cleaned, the cleaned data is written back to the handheld computer 20, and the original data record is deleted from the handheld computer (steps 194, 196, 198 and 202). If the user elects to delete the file, the file is simply deleted from the handheld computer (step 200 and 202). The user may also elect to quarantine the file, in which case the file is moved to a quarantine location within the personal computer 22 and the file is deleted from the handheld computer 20 (steps 201, 203, and 202). Alternatively, the scanner can first determine whether the target of the virus is the personal computer 22 or the handheld computer 20 and quarantine the virus on whichever device the virus will not execute on. If the virus can execute on both platforms, or neither, the virus is quarantined on the personal computer side. If the user chooses to ignore the virus, the scanner will ignore the infected file and continue to scan the remaining files, if there are files left to scan (steps 204 and 188). After all files have been scanned, the antivirus conduit 114 deletes the temporary copy of the files on the personal computer 22 and closes the handheld computer databases 108 (step 205). Control is then returned to the file transfer program manager 110 so that the manager can call another conduit or end the synchronization/scanning operation (step 206).

It is to be understood that the virus scanning may be performed independent from the synchronization, without departing from the scope of the invention. For example, the handheld computer 20 may include an application that transfers data directly between the handheld computer and the antivirus scanner resident on the personal computer 22.

Figure 10:
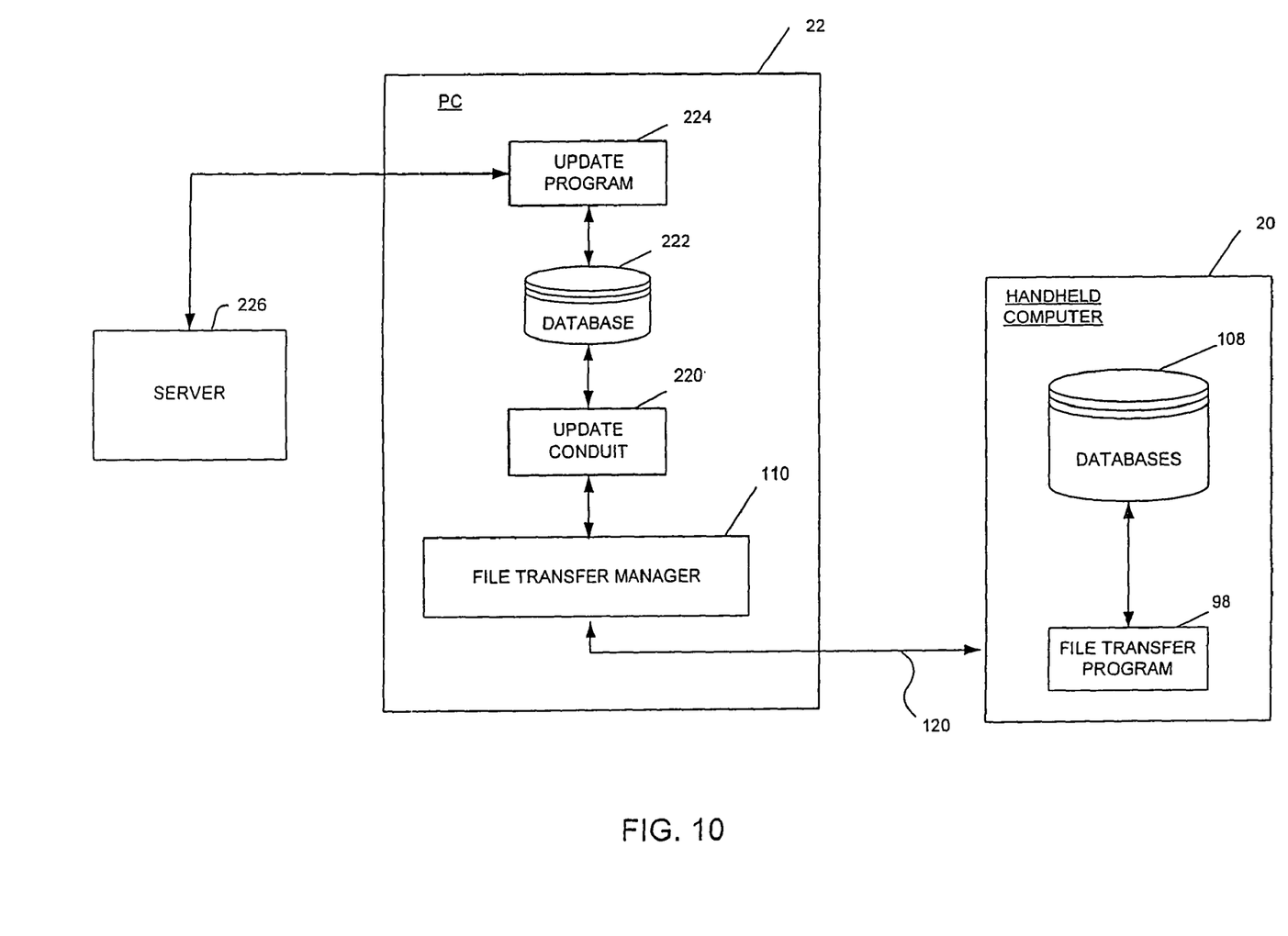
FIG. 10 is a block diagram illustrating an update program on the personal computer communicating with a server and a file transfer program on the handheld computer.

In addition to scanning files on the handheld computer 20 for viruses, when the handheld computer is in communication with the personal computer 22, software (e.g., applications, programs) resident on the handheld computer 20 may be updated. The software may include applications such as address, date book, expense, mail, memo pad, PALM OS, to do list, or games, for example. The file transfer manager 110 is used to collect data from the handheld computer 20 to identify what software is installed on the handheld computer 20 and version of the software. As shown in FIG. 10, the file transfer manager 110 is in communication with an update conduit 220. The update conduit 220 is a dynamic link library that is used by an update program 224 to gather software information from the handheld computer 20. A database 222 may be connected to the update conduit 220 and update program 224 to provide a temporary storage area for the list of software and version identifiers downloaded from the handheld computer 20. The update program 224 is coupled to a server 226 for receiving software updates. The software updates may a new updated version of a program or only a few lines of software code, for example. As described above, the client computer 22 may be connected to the server 226 by way of an Internet service provider coupled to the Internet, and the server may comprise a World Wide Web site maintaining updated versions of applications.

Updated software may be obtained from the server 226 while the handheld computer 20 is in communication with the client computer 22, or the updates may be obtained from the server after the handheld computer is disconnected from the client computer and transferred to the handheld computer the next time it is in communication with the client computer.

Figure 11:
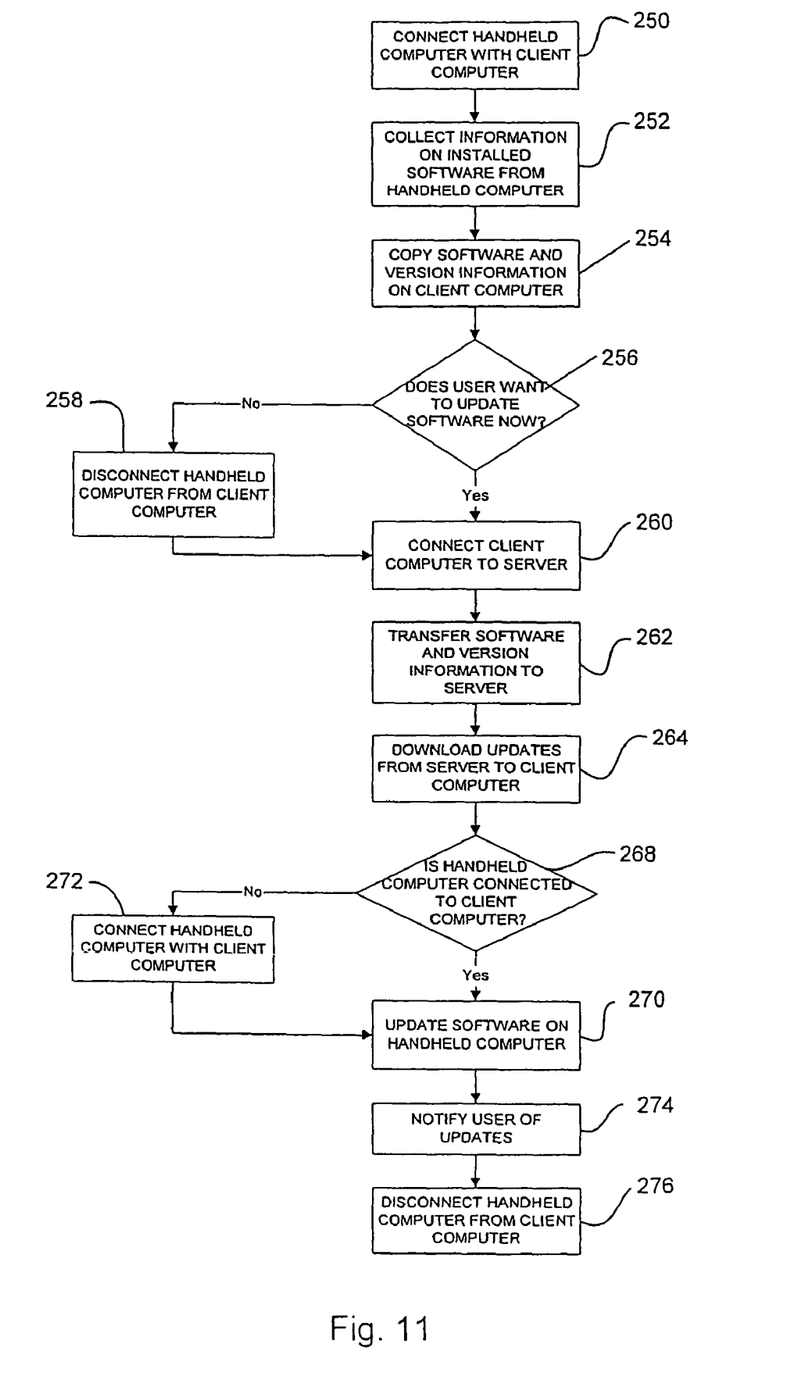
FIG. 11 is a flowchart illustrating a process for updating software on a handheld computer.

FIG. 11 is a flowchart illustrating a process for updating software installed on the handheld computer 20. At step 250, the handheld computer 20 is placed in communication with the client computer 22 (FIGS. 10 and 11). The communication link 120 may be initiated by placing the handheld computer 20 into cradle 24 (FIG. 1) or by any other suitable process, including those described above. The software update may be performed during synchronization of data between the handheld computer 20 and client computer 22, virus scanning of files on the handheld computer, or as a stand alone operation. The update conduit 220 first instructs the file transfer manager 110 to collect software information from the handheld computer 20 (step 252). The update conduit 220 creates a list of applications installed on the handheld computer 20 and version information for each application in database 222 (step 254). A menu box is then displayed to the user to determine which applications the user wants to update and whether he wants to update the applications now or at a later time (step 256). If the user chooses to perform the update at a later time, the update program 224 will store application and version information from the handheld computer 20 and close the communication link 120 (step 258). If required, other conduits may be run before the link 120 is closed. If the updates are to be performed immediately, the communication link 120 will remain open while the updates are retrieved from the server 226.

After the update program 224 receives the software information from the handheld computer 20, it either automatically initiates a connection with the Internet or requests the user to connect with the Internet (if the client computer 22 is not already connected). The client computer 22 is connected to the Internet via a TCP/IP connection and an Internet interface program such as a Web browser is activated (step 260). The update program 224 transmits a sequence of information packets to the server 226 identifying which software versions it would like updated (step 262). The server 226 responds by downloading software updates to the client computer 22. If no versions newer than those already installed on the handheld computer 20 are available, the server 226 sends a message stating this to the client computer 22. The update program 224 may have to contact a plurality of servers 226 to obtain updates for different handheld computer applications. The update program 224 preferably includes a list of Web sites (URLs) to contact for receiving updated versions of handheld computer software. This list may be updated as new applications become available. Alternatively, the update program 224 may contact one Web site which includes links to other sites containing update information. An exemplary process for downloading files from the server 226 to the client computer 22 is described in U.S. patent application Ser. No. 09/001,611, referenced above.

The update program 224 transmits the software updates to the handheld computer 20 if the handheld computer is still connected to the client computer 22 (steps 268 and 270). If the handheld computer 20 is not connected to the client computer 22, the client computer stores the software updates in database 222 until the next time it is connected to the handheld computer (step 272). A dialog box may be displayed on the client computer 22 to report to the user which handheld applications have been updated (step 274). A dialog box may also be displayed to the user after information is transferred from the server 226, to identify the applications for which updates were found, along with the new version numbers, and ask the user which applications he wants updated on his handheld computer 20. After updates are made, the handheld computer 20 is disconnected from the client computer 22 (step 276).

The updates may be performed automatically whenever the handheld computer 20 is connected to the personal computer 22 for synchronization or virus scanning. For example, when a synchronization or virus scanning operation is performed, the software information may be automatically transferred from the handheld computer 20 to the personal computer and the personal computer can check to see if new updates are available. If updates for software installed on the handheld computer 20 are available, a dialog box may be displayed on the personal computer telling the user that his software is out of date and can be updated by clicking on "UPDATE" in the dialog box. The updates may also be performed automatically, without asking the user, so that all employee's handheld computers 20 have the latest applications installed, for example.

It will be observed from the foregoing that the handheld computer virus detection system and method, and software update system and method described herein provide numerous advantages. Importantly, the virus detection system and method allow for efficient detection of viruses on a handheld computer without sacrificing the limited memory of the handheld computer. The virus detection system may also be used to eliminate viruses identified during virus scanning of the handheld computer. The software update method provides an efficient process for updating software on the handheld computer, which may be done in conjunction with synchronization of data or virus scanning of files on the handheld computer.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   identifying software installed on a handheld computer with a client computer and transmitting information on the identified software from the client computer to a server connected to a network, the information including a list of software and version identifiers;

while synchronizing data between the handheld computer and the client computer, transferring updated versions of the identified software installed on the handheld computer from the server to the client computer based on the information on the identified software that is installed on the handheld computer; and updating the identified software installed on the handheld computer with the updated versions transferred to the client computer;

wherein the list of software and version identifiers included in the information on the software identified as installed on the handheld computer are temporarily stored in a database on the client computer;

wherein if the handheld computer is disconnected from the client computer, the updated versions of the identified software installed on the handheld computer are transferred from the server to the client computer and the identified software installed on the handheld computer is updated a next time the handheld computer is in communication with the client computer.

2. The method of claim 1 further comprising initiating communication between the handheld computer and the client computer.

3. The method of claim 2 wherein the initiating communication comprises connecting a serial line between the handheld computer and the client computer.

4. The method of claim 3 wherein the connecting a serial line comprises placing the handheld computer in a cradle connected to the serial line.

5. The method of claim 1 wherein the network is the Internet.

6. The method of claim 1 wherein the network is a local area network.

7. The method of claim 1 further comprising notifying a user of the handheld computer that the installed software has been updated.

8. The method of claim 1 further comprising scanning data on the handheld computer for viruses.

9. The method of claim 1, wherein the updated versions of the identified software are transferred from a plurality of servers.

10. The method of claim 1, wherein the list of software and version identifiers are identified utilizing a file transfer manager of the client computer which is in communication with an update conduit of the client computer.

11. The method of claim 1, wherein the database on the client computer is connected to an update conduit of the client computer.

12. The method of claim 1, wherein if the handheld computer is disconnected from the client computer, the updated versions of the identified software installed on the handheld computer are stored in the database on the client computer until the next time the handheld computer is in communication with the client computer.

13. The method of claim 1, further comprising clearing data record status flags in the database after the identified software installed on the handheld computer is updated with the updated versions transferred to the client computer.

14. The method of claim 1, wherein the database includes a database header and record information.

15. A computer product embodied on a tangible computer readable storage medium comprising:

computer code that reads data from a handheld computer to identify software installed on the handheld computer;

computer code that transmits information on the identified software from a client computer to a server connected to a network, the information including a list of software and version identifiers;

computer code that while synchronizing data between the handheld computer and the client computer, transfers updated versions of the identified software installed on the handheld computer from the server to the client computer based on the information on the identified software that is installed on the handheld computer;

computer code that updates the identified software installed on the handheld computer with the updated versions transferred to the client computer; and a computer readable medium that stores said computer codes;

wherein the computer program product is operable such that the list of software and version identifiers included in the information on the software identified as installed on the handheld computer are temporarily stored in a database on the client computer;

wherein the computer program product is operable such that if the handheld computer is disconnected from the client computer, the updated versions of the identified software installed on the handheld computer are transferred from the server to the client computer and the identified software installed on the handheld computer is updated a next time the handheld computer is in communication with the client computer.

16. The computer product of claim 15 further comprising computer code that initiates communication between the handheld computer and the client computer.

17. The computer product of claim 16 wherein the initiating communication comprises connecting a serial line between the handheld computer and the client computer.

18. The computer product of claim 17 wherein the connecting a serial line comprises placing the handheld computer in a cradle connected to the serial line.

19. The computer product of claim 15 wherein the network is the Internet.

20. The computer product of claim 15 wherein the network is a local area network.

21. The computer product of claim 15 further comprising computer code that notifies a user of the handheld computer that the installed software has been updated.

22. The computer product of claim 15 further comprising computer code that scans data on the handheld computer for viruses.

23. A system including a tangible computer readable storage medium comprising:

logic that reads data from a handheld computer to identify software installed on the handheld computer;

logic that transmits information on the identified software from a client computer to a server connected to a network, the information including a list of software and version identifiers;

logic that while synchronizing data between the handheld computer and the client computer, transfers updated versions of the identified software installed on the handheld computer from the server to the client computer based on the information on the identified software that is installed on the handheld computer; and logic that updates the identified software installed on the handheld computer with the updated versions transferred to the client computer;

wherein the system is operable such that the list of software and version identifiers included in the information on the software identified as installed on the handheld computer are temporarily stored in a database on the client computer;

wherein the system is operable such that if the handheld computer is disconnected from the client computer, the updated versions of the identified software installed on the handheld computer are transferred from the server to the client computer and the identified software installed on the handheld computer is updated a next time the handheld computer is in communication with the client computer.

24. A method comprising:

identifying software installed on a handheld computer with a client computer and transmitting information on the identified software from the client computer to a server connected to a network, the information including a list of software and version identifiers;

while scanning data on the handheld computer for viruses, transferring updated versions of the identified software installed on the handheld computer from the server to the client computer based on the information on the identified software that is installed on the handheld computer; and updating the identified software installed on the handheld computer with the updated versions transferred to the client computer;

wherein the list of software and version identifiers included in the information on the software identified as installed on the handheld computer are temporarily stored in a database on the client computer;

wherein if the handheld computer is disconnected from the client computer, the updated versions of the identified software installed on the handheld computer are transferred from the server to the client computer and the identified software installed on the handheld computer is updated a next time the handheld computer is in communication with the client computer.

25. A computer product embodied on a tangible computer readable storage medium comprising:

computer code that reads data from a handheld computer to identify software installed on the handheld computer;

computer code that transmits information on the identified software from a client computer to a server connected to a network, the information including a list of software and version identifiers;

computer code that while scanning data on the handheld computer for viruses, transfers updated versions of the identified software installed on the handheld computer from the server to the client computer based on the information on the identified software that is installed on the handheld computer;

computer code that updates the identified software installed on the handheld computer with the updated versions transferred to the client computer; and a computer readable medium that stores said computer codes;

wherein the computer program product is operable such that the list of software and version identifiers included in the information on the software identified as installed on the handheld computer are temporarily stored in a database on the client computer;

wherein the computer program product is operable such that if the handheld computer is disconnected from the client computer, the updated versions of the identified software installed on the handheld computer are transferred from the server to the client computer and the identified software installed on the handheld computer is updated a next time the handheld computer is in communication with the client computer.

26. A system including a tangible computer readable storage medium comprising:

logic that reads data from a handheld computer to identify software installed on the handheld computer;

logic that transmits information on the identified software from a client computer to a server connected to a network, the information including a list of software and version identifiers;

logic that while scanning data on the handheld computer for viruses, transfers updated versions of the identified software installed on the handheld computer from the server to the client computer based on the information on the identified software that is installed on the handheld computer; and logic that updates the identified software installed on the handheld computer with the updated versions transferred to the client computer;

wherein the system is operable such that the list of software and version identifiers included in the information on the software identified as installed on the handheld computer are temporarily stored in a database on the client computer;

wherein the system is operable such that if the handheld computer is disconnected from the client computer, the updated versions of the identified software installed on the handheld computer are transferred from the server to the client computer and the identified software installed on the handheld computer is updated a next time the handheld computer is in communication with the client computer.

* * * * *